United States Patent [19]

Purcell

[11] Patent Number: 4,977,315
[45] Date of Patent: Dec. 11, 1990

[54] LIQUID CRYSTAL POSITION DETERMINING SYSTEM AND WAND DEVICE

[75] Inventor: Alexander M. Purcell, Guilford, Conn.

[73] Assignee: Summagraphics Corporation

[21] Appl. No.: 417,869

[22] Filed: Oct. 6, 1989

[51] Int. Cl.$^5$ .......................... G01V 9/04; G09G 3/02
[52] U.S. Cl. ..................................... 250/221; 340/707
[58] Field of Search ................ 250/221; 350/332, 333, 350/335, 345; 340/707, 716, 784

[56] References Cited

U.S. PATENT DOCUMENTS

| | | | |
|---|---|---|---|
| 4,188,566 | 2/1980 | Miwa et al. | 340/707 |
| 4,531,230 | 7/1985 | Brogardh | 250/227 |
| 4,602,907 | 7/1986 | Foster | 340/707 |
| 4,697,175 | 9/1987 | Macdonald | 340/707 |
| 4,785,564 | 11/1988 | Gurtler | 340/707 |
| 4,794,634 | 12/1988 | Torihata et al. | 340/707 |
| 4,803,737 | 2/1989 | Sato et al. | 382/65 |
| 4,839,634 | 6/1989 | More et al. | 340/707 |

FOREIGN PATENT DOCUMENTS

| | | | |
|---|---|---|---|
| 2124070 | 11/1972 | Fed. Rep. of Germany | 340/707 |
| 0010232 | 1/1983 | Japan | 340/707 |
| 0179824 | 9/1985 | Japan | 340/707 |
| 1171822 | 8/1985 | U.S.S.R. | 340/707 |

*Primary Examiner*—David C. Nelms
*Assistant Examiner*—Michael Messinger
*Attorney, Agent, or Firm*—Rosen, Dainow & Jacobs

[57] ABSTRACT

A coordinate position determining system and method includes a liquid crystal material separating first and second groups of conductors. The tablet is at least partially light transmissive, but may include a partially reflective layer. The first and second groups or conductors are sequentially scanned at different times. A wand adapted to be positioned against the tablet includes a light detector, and may also include a light source.

11 Claims, 2 Drawing Sheets

U.S. Patent  Dec. 11, 1990  Sheet 1 of 2  4,977,315
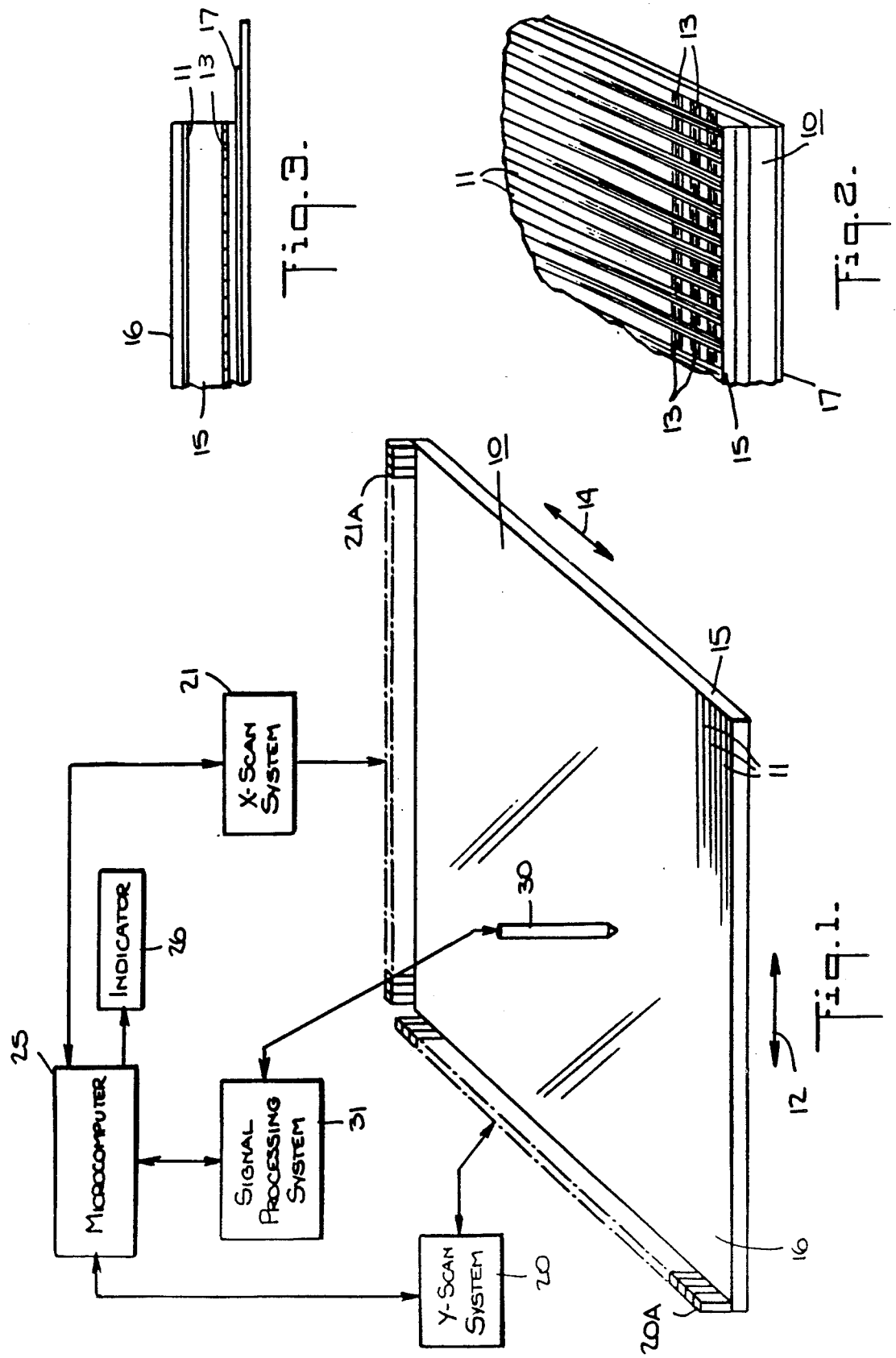

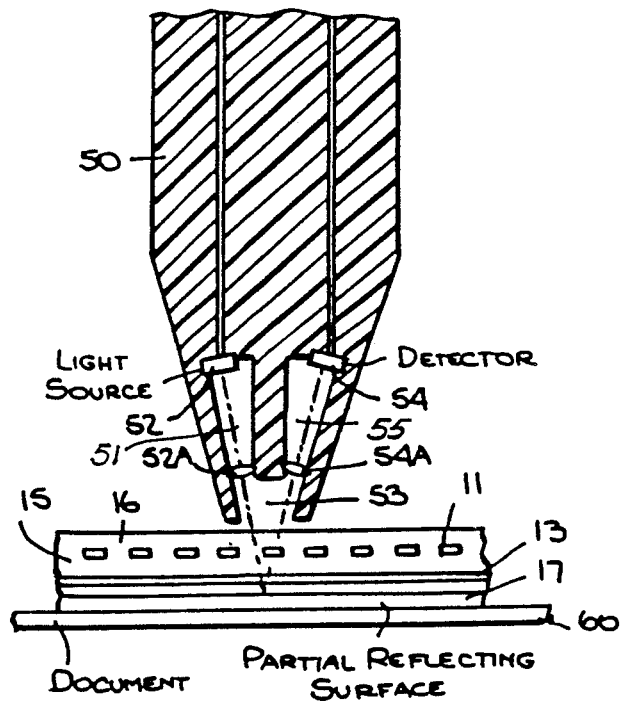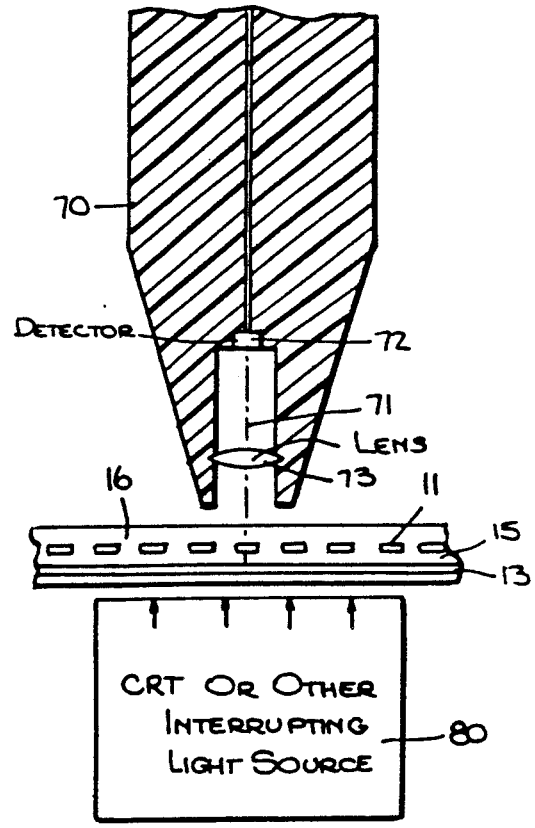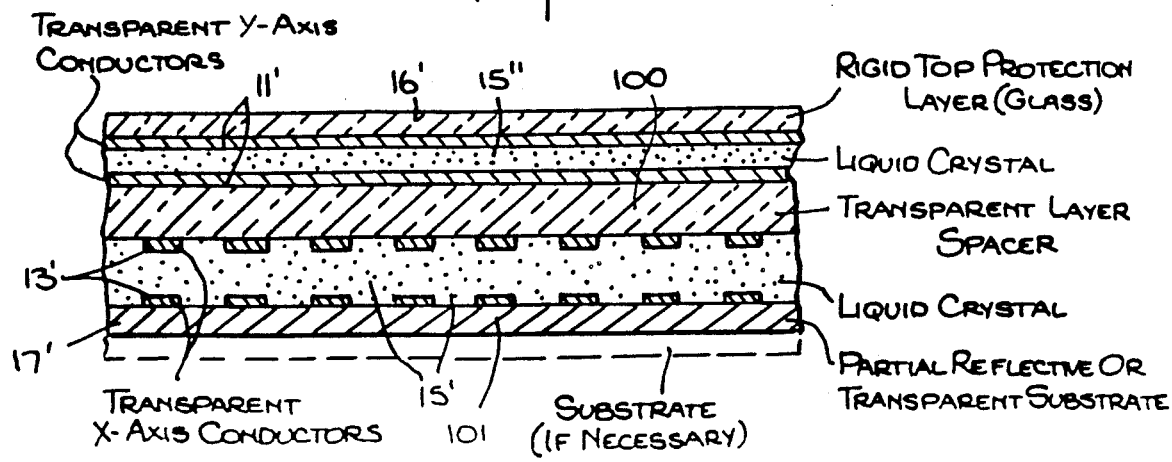

LIQUID CRYSTAL POSITION DETERMINING SYSTEM AND WAND DEVICE

BACKGROUND OF THE INVENTION

This invention relates to a method and apparatus for determining a position, and is more in particular directed to an improved method and apparatus for determining the coordinates on a tablet.

SUMMARY OF THE INVENTION

The invention is directed to the provision of a position coordinate positioning arrangement of the above type, wherein the tablet is transparent, thereby enabling the determination of coordinates of a position on a document, such as a map, or on a light emitting device such as a CRT or the like.

Briefly stated, in accordance with the invention a position determining system comprises a tablet having a plurality of coplanar spaced transparent first conductive strips, and a plurality of coplanar spaced transparent second conductive strips. The plane of the first strips is parallel to and spaced from the plane of the second strips, and a liquid crystal material between the first and second strips. The system further comprises means for sequentially applying voltages between said conductive strips to excite a moving region of the liquid crystal material. The voltages preferably excite linear regions, e.g. lines, to move across the tablet. This may be done by scanning only the first conductor strips during a first interval and means for scanning the second strips only during a second interval that is not within of the first interval. Alternatively, the voltages may excite regions of the liquid crystal between parallel pairs of conductive strips. The tablet is at least partially light transmissive substantially throughout its extent, and may be substantially fully transmissive or it may include a partially mirrored surface on one side thereof.

A wand adapted to be placed against the tablet includes a light detector for detecting light received from the tablet, and may also include a light source adapted to be directed toward the tablet.

The conductor strips of the two conductor groups preferably extend substantially orthogonally to one another.

In accordance with a further feature of the invention, a tablet system for a position determining system comprises a tablet having a plurality of coplanar parallel spaced transparent first conductive strips extending in a first direction, and a plurality of coplanar parallel spaced transparent second conductive strips extending in a direction that differs from the first direction. The plane of the first strips is parallel to and spaced from the plane of the second strips, and a liquid crystal material is provided between the first and second strips. The tablet is at least partially light transmissive whereby objects adjacent one face thereof are identifiable by a viewer at the other face thereof. The system further comprises means for sequentially applying a voltage to the first conductive strips while maintaining the second strips at a determined reference potential, and means for sequentially applying a voltage to the second conductive strips while maintaining the first strips at a determined reference potential.

In accordance with a still further feature of the invention, a position determining system comprises a tablet having a plurality of first coplanar spaced transparent conductive strips, and a plurality of second coplanar spaced transparent conductive strips. The plane of the first strips is parallel to and spaced from the plane of the second strips, and a liquid crystal material is provided between the first and second strips, whereby the light transmission properties of the liquid crystal material may be locally varied in dependence upon the application of electric potentials to the strips. Means are provided for sequentially applying potentials to the strips whereby a moving region is produced in the strip having transmission properties different from regions adjacent thereto. A manually movable sensor is adapted to be positioned adjacent the table for sensing local variations in the transmission properties.

In a still further feature of the invention, a position determining system comprises first and second surfaces spaced apart by a substantially constant distance. A first array of transparent spaced conductors is provided on the first surface, and a second array of transparent spaced conductors is provided on the second surface, whereby the conductors of the second array extend in directions that are different from conductors of the second array at corresponding positions of the first and second surfaces. The system further comprises a liquid crystal material between the first and second surfaces substantially throughout the extent of the first and second arrays, whereby the optical characteristics of the material is locally modified in response to the application of potentials to the conductors of the first and second arrays. Means are provided for separately scanning the conductors of the first and second arrays whereby the optical characteristics of first regions of the material corresponding substantially to the shapes and locations of the conductors of the first array are sequentially modified during the scanning of the first array and the optical characteristics of second regions of the material corresponding substantially to the shapes and locations of the conductors of the second array are sequentially modified during the scanning of the second array.

In a method in accordance with the invention for determining coordinate positions on a tablet having first and second pluralities of equally spaced coplanar parallel conductor strips, the first and second pluralities being spaced apart by a liquid crystal material, the voltages are sequentially applied to the first conductive strips while maintaining the second strips at a determined reference potential, and voltages are sequentially applied to the second conductive strips while maintaining the first strips at a determined reference potential. The coordinates on the tablet are determined at which pulses are produced in a light detector placed adjacent the tablet.

BRIEF DESCRIPTION OF THE DRAWING

In order that the invention may be more clearly understood, it will now be disclosed in greater detail with reference to the accompanying drawing, wherein:

FIG. 1 if a perspective view of a system in accordance with the invention;

FIG. 2 is an enlarged view of a portion of the tablet of FIG. 1;

FIG. 3 is an enlarged cross sectional view of a portion of the tablet of FIG. 1;

FIG. 4 is an enlarged view of one modification of a cursor stylus or wand that may be employed in the system of FIG. 1;

FIG. 5 is an enlarged view of another modification of a cursor stylus or wand that may be employed in the system of FIG. 1; and FIG. 6 is a enlarged cross section view of a preferred tablet.

DETAILED DISCLOSURE OF THE INVENTION

Referring now to the drawings, and more in particular to FIGS. 1–3, a system in accordance with the invention comprises a tablet 10 comprised of a plurality of parallel coplanar equally spaced apart transparent conductors 11 extending in a first direction indicated by the arrow 12, and a plurality parallel coplanar equally spaced apart transparent conductors 13 extending in a second direction indicated by the arrow 14. The planes of the two groups of conductors are parallel and spaced apart, and a liquid crystal material 15 is provided in the space between the planes of the conductors. An upper transparent protective layer 16 may also be provided. In one embodiment of the invention, a lower partially mirrored surface 17, for example 20 to 50% reflective, is provided adjacent the bottom of the tablet below the conductors 13.

In accordance with the invention, a source 20 of scanning signals is connected to the conductors 11, e.g. via a suitable interface 20A, to sequentially apply a given scanning voltage thereto, and a source 21 of scanning signals is connected to sequentially apply a given scanning voltage to conductors 13, e.g. via a suitable interface 21A. The scanning sources 20, 21 may be controlled by a microcomputer 25. The interfaces 20A and 21A may be liquid crystal contact connectors.

In addition, a cursor stylus or wand 30 adapted to be manually or otherwise positioned at any desired location on the tablet 10, is connected to a signal processing circuit 31. The signal processing circuit 31 is connected to the microcomputer 25, and may include a filter, an amplifier, a threshold detector, etc. . .

A wand that may be employed in the tablet of FIGS. 1–3, as illustrated in FIG. 4, is comprised of a body portion 50 adapted to be held by a user, the body portion having a cavity 51 open at one end thereof. A light source 52 in the cavity, such as an IR LED, is mounted to direct light through the cavity opening 53 toward the tablet 10 via a lens 52A. In this embodiment of the invention, the light passes through the tablet and is partially reflected from the mirrored surface 17. The reflected light is received by a detector 54 positioned in the cavity 55 via a lens 54A.

In order to enable an understanding of the invention, assume that the tablet is placed upon a document 60, such as a map, and it is desired to provide output signals from the wand corresponding to a given location on the map. In this instance, the wand is manually positioned to the desired location on the map. When the conductors of the tablet are not energized, the liquid crystal layer will not block light. Accordingly, since the tablet is only partially reflective, the desired location on the map is clearly visible to the operator, and the light from the source 52 will be reflected to a maximum extent to the detector 54. If, now, the conductors 13 of the one group are all held at a low potential, and the conductors 11 of the other group are sequentially raised to a sufficiently high potential to locally energize the liquid crystal layer, a darkened line will move across the tablet in the direction 14, or Y direction. When this darkened line passes the location of the cursor, a pulse will be generated by the detector 54. The timing of this pulse, in relation to the scanning of the conductors 11, provides an indication of the location of the cursor in the Y direction. This indication may be converted by the microcomputer 25 into signals for the indicator display 26 to display the Y coordinate of the wand. Similarly, when the conductors 11 are held at a low potential and the conductors 13 scanned, a pulse will be developed by the detector 54 indicative of the X location of the wand, and this indication may also be displayed on the indicator 26.

The arrangement of the invention, as above described, may thus be used to enable determine the coordinates of any position of the document, or to position the wand at any desired coordinates.

In a further embodiment of the invention, as illustrated in FIG. 5, the tablet 10 is fully transmissive, i.e. is not provided with a reflective surface. In this embodiment of the invention, the wand 70 is provided with a cavity 71 within which a detector 72 is located. A lens 73 is positioned to direct light received from the tablet 10 to the detector 72. The tablet is adapted to be positioned adjacent the face of a CRT 80 or other light emitting display device.

In the use of the arrangement of FIG. 5, the wand is positioned and the conductors of the tablet are scanned, as in the previously described embodiment of the invention, to enable the determination of the coordinates of a position on the face of the CRT, or to position the wand at determined coordinates.

FIG. 6 illustrates a cross sectional view of a preferred embodiment of the tablet. In this embodiment of the invention, rather than provide scanning signals between X-axis and Y-axis conductors, a pair of parallel X-axis conductors 13' are separated by a liquid crystal layer 15', and a pair of Y-axis conductors 11' are separated by another liquid crystal layer 15". The two pairs of conductors are separated by a transparent layer spacer 100. A rigid transparent top layer 16' forms the top surface of the tablet, and the lower layer 101 may be transparent or partially reflective. A further lower substrate may be employed, if necessary. In this embodiment of the invention, scanning voltages are successively applied between pairs of Y-axis conductors, to scan a line of light in the Y direction, and scanning voltages are successively applied between pairs of X-axis conductors, to scan a line of light in the X direction. The cursor separately senses the time at which it receives light from these scanning lines, to enable the indication of the cursor location.

The invention thereby provides an economical apparatus for determining coordinate positions on a document, CRT, or other device, and that is not subjected to interference from unwanted electromagnetic radiation.

While the invention has been disclosed and described with reference to a limited number of embodiments, it will be apparent that variations and modification may be made therein, and it is therefore intended in the following claims to cover each such variation and modification as falls within the true spirit and scope of the invention.

What is claimed is:

1. A position determining system comprising:
a tablet having a plurality of coplanar spaced substantially transparent first conductor strips, a plurality of coplanar spaced substantially transparent second conductor strips, the plane of said first strips being parallel to and spaced from the plane of said second strips, and a liquid crystal material between said first and second strips;

means for scanning said conductor strips to cause a dark line to propagate across the tablet surface;

said tablet being at least partially light transmissive substantially throughout its extent such that objects on one side of said tablet are visible from its opposite side;

a wand-type device connected to the system and positionable by a user over its opposite side; p1 means connected to the wand-type device for detecting when a dark line crosses under the wand-type device.

2. The system of claim 1, wherein said tablet has a partially mirrored surface on said one side thereof.

3. The system of claim 2, wherein said wand-type device includes a light source adapted to be directed toward said tablet, and a light detector for receiving light that has passed through said liquid crystal material and been reflected from said partially mirrored surface.

4. The system of claim 1, wherein said tablet is substantially fully transmissive, a light source is provided for illuminating said one side, and said wand-type device includes a detector for detecting the light from said light source passing through said tablet.

5. The system of claim 1, wherein the first conductor strips and second conductor strips extend substantially orthogonally to one another.

6. A position determining system comprising:

a tablet having a plurality of coplanar spaced substantially transparent first conductor strips, a plurality of coplanar spaced substantially transparent second conductor strips, the plane of said first strips being parallel to and spaced from the plane of said second strips, and a liquid crystal material between said first and second strips;

said system further comprising means for scanning only said first conductor strips during a first interval to cause a dark line to propagate across the tablet surface in one direction, means for scanning said second strips only during a second interval that is not within said first interval to cause a dark line to propagate across the tablet surface in a different direction;

said tablet being at least partially light transmissive substantially throughout its extent such that objects on one side of said tablet are visible from its opposite side, a wand-type device connected to the system and positionable by a user over its opposite side, means connected to the wand-type device for detecting when a dark line crosses under the wand-type device.

7. The system of claim 6, wherein said tablet has a partially mirrored surface on one side thereof.

8. The system of claim 6, wherein said tablet is substantially fully transmissive to light.

9. The tablet system of claim 6, wherein the scanning means comprise means for sequentially applying potentials to said conductor strips.

10. The tablet system of claim 9, wherein said first and second conductor strips extend in orthogonal directions.

11. The tablet system of claim 6, further comprising third and fourth parallel conductor strips in parallel planes parallel to the plane of said first strips, a liquid crystal material between said third and fourth conductor strips, transparent spacing means betweens between said third and fourth strips and said first and second strips, said third and fourth strips extending in a direction orthogonal to said first and second strips, and means for sequentially applying a voltage between adjacent pairs of said third and fourth strips.

* * * * *

UNITED STATES PATENT AND TRADEMARK OFFICE
CERTIFICATE OF CORRECTION

PATENT NO. : 4,977,315

DATED : December 11, 1990

INVENTOR(S) : Alexander M. Purcell

It is certified that error appears in the above-identified patent and that said Letters Patent is hereby corrected as shown below:

Column 5, line 10, after "side" delete --pl--.

Column 6, line 32, after "means" delete --betweens--.

Signed and Sealed this

Nineteenth Day of January, 1993

*Attest:*

DOUGLAS B. COMER

*Attesting Officer*  Acting Commissioner of Patents and Trademarks